Patented May 11, 1948

2,441,512

UNITED STATES PATENT OFFICE 2,441,512

SULFUR CONTAINING VAT DYESTUFFS OF THE ANTHRAQUINONE SERIES

Mario Scalera, Somerville, N. J., assignor to American Cyanamid Company, New York, N. Y., a corporation of Maine No Drawing. Application March 23, 1944, Serial No. 527,845

9 Claims. (Cl. 260—328)

This invention relates to new vat dyestuffs containing sulfur which may be designated as benzanthrone anthraquinone thioxanthenes. It also relates to a process of preparing them.

The compounds of the present invention contain the following ring system:

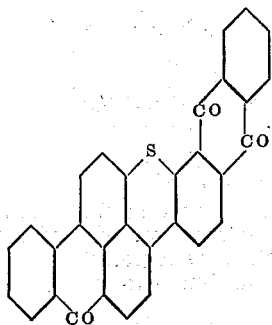

The products are made by condensing bz1-benzanthronyl-anthraquinonyl sulfides with an alkaline condensing agent at moderate elevated temperatures, preferably between 100 and 130° C. Ring closure appears to take place to produce the new compounds which contain a new heterocyclic six membered ring. The ring system has not been described before and, therefore, the products of the present invention constitute a new class of heterocyclic derivatives.

Bz1-benzanthronyl sulfides are known and have been subjected to alkali fusion. However, these always resulted in a splitting of the bz1-sulfur linkage with the formation of isodibenzanthrones as main products. I have found that if the temperature is not permitted to rise above 140° C. ring closure of my sulfides is effected without splitting and the new compounds of the present invention result. It is desirable not to operate quite so close to the dividing line of temperature and best results and most reliable operation are obtained when the temperature is kept between 110 and 130° C.

A number of compounds can be prepared having the ring system described above. The simplest is the unsubstituted compound which is obtained from bz1-benzanthronyl-1'-anthraquinonyl sulfide. However, other compounds may be condensed in a smaller way. For example, 6,bz1-benzanthronyl-bis (1-anthraquinonyl)-sulfide will also undergo condensation to give a benzanthrone anthraquinone trioxanthene substituted by an anthraquinonyl sulfide group. I have not determined with complete certainty whether this anthraquinonyl sulfide group also undergoes ring closure to form an additional five membered sulfur containing heterocyclic ring. The general behaviour of the product obtained is consistent with either assumption.

Other substituted benzanthrone anthraquinone thioxanthenes may be prepared by the alkali fusion of substituted bz1-benzanthronyl-1'-anthraquinonyl sulfides or they may be prepared by direct substitution in the parent compound, for example by halogenation.

The substituted bz1-benzanthronyl-1'-anthraquinonyl sulfides mentioned above are obtainable by the reaction of a substituted bz1 halogen benzanthrone with 1-mercapto anthraquinone; or by the reaction of bz1 halogen benzanthrone with a substituted 1-mercapto anthraquinone; or by the reaction of bz1 halogen benzanthrone and 1-mercapto anthraquinone both of which bear substituents in other positions.

Substituted bz1 halogen benzanthrones useable in this process are, for instance bz1-chloro-6-methyl benzanthrone; nitro bz1 halogen benzanthrones (obtainable by nitrating bz1 halogen benzanthrone in nitrobenzene) bz2-hydroxy bz1-bromo benzanthrone, as well as the corresponding methoxy and ethoxy compounds; 6-benzoylamino bz1 bromo benzanthrone; 6, bz1 dibromo benzanthrone, etc. In the latter case of the dihalogen benzanthrone it is possible to bring two molecules of 1-mercapto anthraquinone into reaction to obtain the sulfide of the formula:

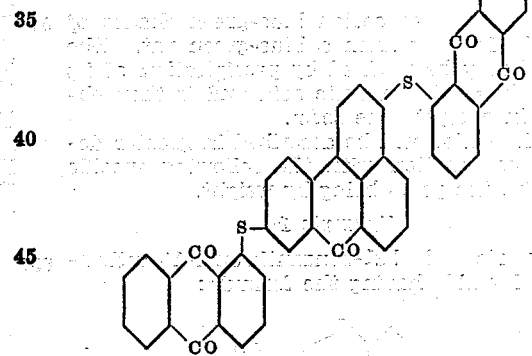

which may then be ring closed in alkaline medium to give one of the typical compounds of my invention.

Examples of substituted 1-mercapto anthraquinones useable in this process are, for instance, 1-mercapto-4-(and 5-)benzoylamino anthraquinone; 1-mercapto-4-methoxy anthraquinone; 4-mercapto-1,1'-dianthrimide; 1,5- dimercapto anthraquinone, etc. These substituted mercapto anthraquinones are obtainable, in general by the action of sodium sulfide or polysulfide, in alcoholic medium, on the corresponding halogen anthraquinones.

Obviously, when substituents are introduced either in the benzanthrone or in the anthraquinone residue of the sulfides used as starting materials for the compounds of my invention, the 2 position, in both the benzanthrone and anthraquinone residue, must be left unsubstituted to permit formation of the thioxanthene ring.

The substituents in the parent thioxanthene compound may also be introduced after ring closure; the positions occupied by the entering substituents have not been determined in most cases. For instance, the benzanthrone anthraquinone thioxanthene may be chlorinated to a dichloro or a trichloro derivative. These chlorinated derivatives may be in turn reacted with compounds containing a mobile hydrogen, e. g. amino anthraquinones, to form new and valuable substituted amino derivatives of the parent compound.

The unsubstituted benzanthrone anthraquinone thioxanthene is a dark powder which crystallizes from nitrobenzene in the form of thin black needles having a greenish tinge. It is soluble in concentrated sulfuric acid to give a brown solution which turns bright green on dilution to 90% sulfuric acid. It dyes cotton blue from a violet hydrosulfite bath.

If the concentrated sulfuric acid solution of the dyestuff is treated with hydrogen peroxide derivatives such as for example persulfuric acid, or other peracids, a new dyestuff results which contains additional oxygen and has the following formula:

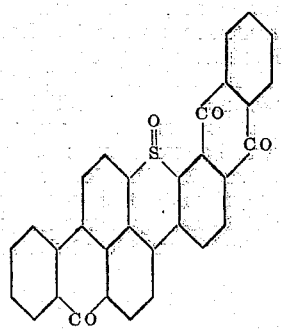

This dyestuff dyes cotton blue-green shades of excellent fastness from a blue-green vat. The dyestuff may be purified by precipitation of its sulfate from 85% sulfuric acid and is then obtained in a crystalline form.

The invention will be described in greater detail in conjunction with the following specific examples, the parts being by weight.

*Example 1*

10 parts of bz1-benzanthronyl-1'-anthraquinonyl sulfide having the formula:

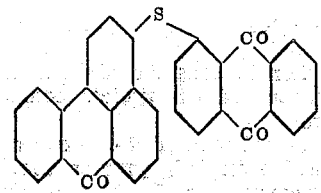

are introduced into a melt of 100 parts of caustic potash and 75 parts of methyl alcohol. A smooth yellow slurry results which is gradually heated to 125° C. and held at 125–130° C. for several hours. It gradually turns to a smooth thin black melt and when the reaction appears complete the product is drowned in 2000 parts of water, boiled and filtered. The filtration cake is blue-black and is washed with water until the washing is free from color and alkali and may then be dispersed to a dyestuff paste by conventional means.

The product when dry is a black powder which dissolves in concentrated sulfuric acid with a brown color. It may be recrystallized from boiling nitrobenzene, separating in thin blue-black needles which are analytically pure. It dissolves in boiling nitrobenzene with a beautiful dichroism, being pale blue by transmitted light and deep red by reflected light. The compound has the following formula:

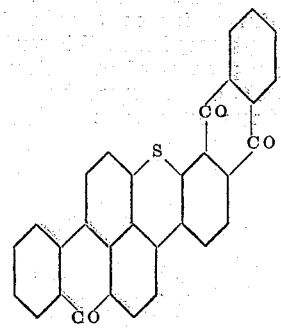

If ethyl alcohol is used in place of methyl alcohol in the caustic fusion the same product is obtained and the caustic potash may be replaced by caustic soda, but the melt is less easily handled.

*Example 2*

67 parts of the compound prepared in Example 1 are dissolved in 1000 parts of 96% sulfuric acid. The resulting olive slurry is treated with 39 parts of ammonium persulfate, dissolved in 700 parts of 96% sulfuric acid, the temperature being kept between 30 and 50° C. by external cooling if necessary.

The resulting solution is drowned in water, filtered, and washed free of acid. There is obtained a green presscake, which may be dispersed to a dyeing paste, or dried to a black powder. The yield is quantitative.

The new product is already in a pure state; it may be further purified, if desired, by dissolving it in 20 parts of 98% sulfuric acid, adding 8 parts of 50% sulfuric acid, and filtering. The product, when freed from sulfuric acid, is in the form of green crystals. It dyes cotton from a blue-gray vat strong blue-green shades of good fastness, particularly to light. It corresponds to the formula:

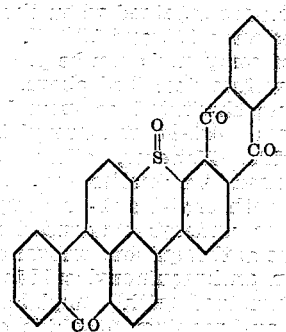

Example 3

10 parts of bz1,6-benzanthronyl bis (1-anthra-quinonyl)-sulfide of the formula:

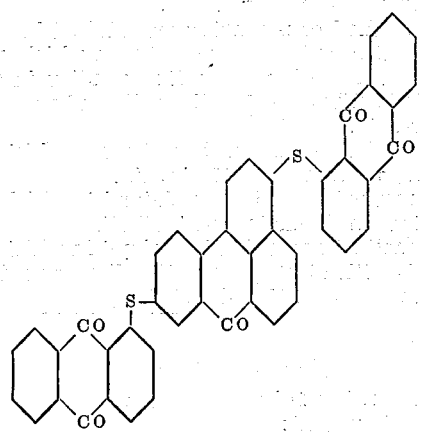

(which may be obtained in the form of yellow crystals by reacting 6,bz1-dibromo benzanthrone with 2 moles of the sodium salt of 1-mercapto anthraquinone in boiling nitrobenzene in the presence of copper oxide) are introduced into a melt of 100 parts of caustic potash and 65 parts of methyl alcohol at 100° C. The melt is refluxed and held at 130-134° C. for several hours until the change from yellow to black is complete. Thereupon, it is poured into 1500 parts of water, 5 parts of sodium hydrosulfite is added to prevent premature oxidation, and filtered. The red-brown filtrate is aerated, resulting in precipitation of the dyestuff which is recovered by filtration, the cake being washed with hot water until the out-run is colorless.

A good yield of the dyestuff is obtained which dyes cotton slate gray from a blue vat. If desired it may be still further purified by recrystallization from boiling nitrobenzene in which it is somewhat soluble hot and much less soluble cold. When completely pure it is dichroic in nitrobenzene, giving a green-blue color by transmitted light and red by reflected light. The purified product dyes cotton a bright blue-gray from a blue-black vat and corresponds to the formula:

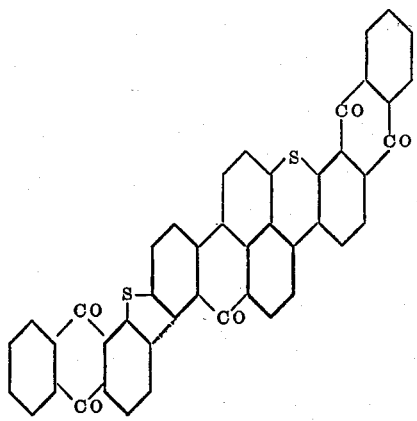

the dotted line indicating that a ring closure may or may not have occurred between the positions shown.

Example 4

50 parts of benzanthrone anthraquinone thioxanthene, prepared as described in Example 1, are suspended in 500 parts of nitrobenzene. One part of iodine and 150 parts of sulfuryl chloride are then added, and the mixture is agitated at 80-90° C. for a period of several hours.

The crystalline, red-violet product is filtered, washed with nitrobenzene, and then with alcohol. It is freed from traces of nitrobenzene by steam, filtered again from the aqueous suspension, washed and dried.

The product, obtained in good yield, is sparingly soluble in the vat from which it dyes the fiber weak blue-gray shades. According to analysis it is a mixture of di- and trichlorinated derivatives.

Example 5

70 parts of chlorinated benzanthrone anthraquinone thioxanthene, obtainable as described in Example 4, 60 parts of alpha amino anthraquinone, 30 parts of anhydrous soda ash and 0.5 part of copper bronze are slurried together in 750 parts of nitrobenzene.

The mixture is refluxed for 15 to 20 hours, allowed to cool, and filtered. The product is washed with nitrobenzene, then with alcohol, then steam distilled free of adhering solvent. It is filtered from the aqueous suspension, washed and dried.

The product may be purified, if desired, by precipitating its sulfate from sulfuric acid of 80% strength. It dyes the fiber violet shades from a yellowish-gray vat. It has the formula:

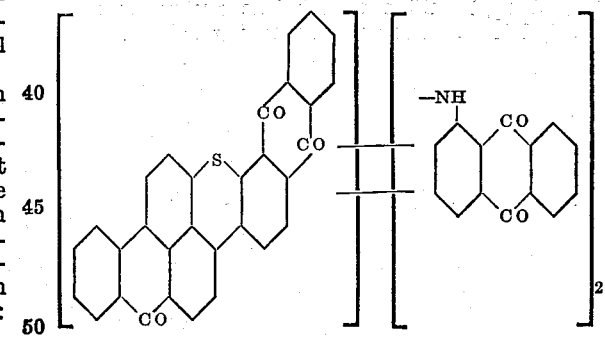

I claim:
1. Vat dyestuffs of the benzathrone anthraquinone thioxanthene series containing the following ring system:

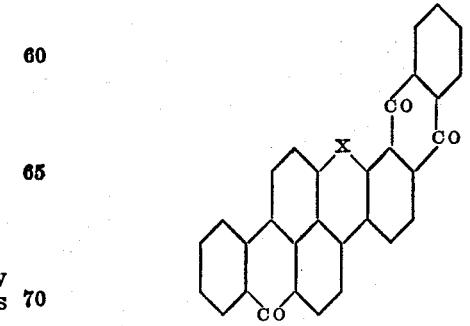

where X is a member of the group consisting of S and S=O.

2. A benzanthrone anthraquinone thioxanthene of the formula:

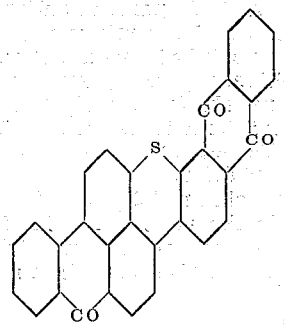

3. An oxidized benzanthrone anthraquinone thioxanthene having the formula:

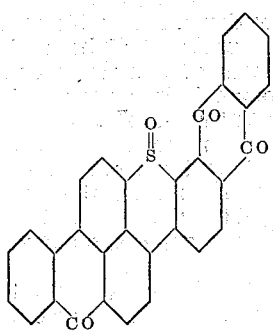

4. A method of producing benzanthrone anthraquinone thioxanthene vat dyestuffs which comprises subjecting a bz1-benzanthronyl-anthraquinonyl sulfide to alkaline fusion at an elevated temperature not exceeding 140° C.

5. A method of preparing benzanthrone anthraquinone thioxanthene which comprises subjecting a bz1 benzanthronyl 1' anthraquinonyl sulfide to an alkaline fusion at an elevated temperature not exceeding 140° C.

6. A method of preparing an oxidized benzanthrone anthraquinone thioxanthene which comprises subjecting the dyestuff in solution in concentrated sulfuric acid to the action of an oxidative per-acid.

7. A method according to claim 6 in which the oxidizing agent is per-sulfuric acid.

8. A method according to claim 4 in which the fusion is with alcoholic caustic alkali.

9. A method according to claim 4 in which the fusion is with alcoholic caustic alkali at a temperature between 100 and 130° C.

MARIO SCALERA.

REFERENCES CITED

The following references are of record in the file of this patent:

UNITED STATES PATENTS

| Number | Name | Date |
|---|---|---|
| 1,783,659 | Luttringhams et al. | Dec. 20, 1930 |
| 1,999,997 | Perkins | Apr. 30, 1935 |
| 2,025,546 | Nawiasky et al. | Dec. 24, 1935 |
| 2,059,647 | Perkins | Nov. 3, 1936 |
| 2,144,365 | Eichholz | Jan. 17, 1939 |
| 2,212,029 | Lulek | Aug. 20, 1940 |

FOREIGN PATENTS

| Number | Country | Date |
|---|---|---|
| 495,661 | Great Britain | Nov. 17, 1938 |